United States Patent [19]

Mani et al.

[11] 4,125,504
[45] Nov. 14, 1978

[54] CEMENT ADDITIVES COMPRISING A POLYMER LATEX CONTAINING A STYRENE-ACRYLATE-ACRYLAMIDE INTERPOLYMER AND A BUTADIENE RUBBER

[75] Inventors: Inder Mani; James Peters, both of Midland, Mich.

[73] Assignee: The Dow Chemical Company, Midland, Mich.

[21] Appl. No.: 864,420

[22] Filed: Dec. 27, 1977

[51] Int. Cl.² .................................................. C08L 9/10
[52] U.S. Cl. ....................... 260/29.7 S; 260/29.7 UA; 260/29.7 W
[58] Field of Search ..................... 260/29.7 S, 29.7 W, 260/29.7 UA

[56] References Cited

U.S. PATENT DOCUMENTS

| | | | |
|---|---|---|---|
| 2,964,490 | 12/1960 | Howland et al. | 260/29.7 S |
| 2,994,680 | 8/1961 | Hammon et al. | 260/29.6 |
| 2,994,683 | 8/1961 | Calvert | 260/29.6 |
| 3,043,790 | 7/1962 | Sanders | 260/29.7 |
| 3,239,479 | 3/1966 | Roenicke et al. | 260/29.7 S |
| 3,378,605 | 8/1968 | Baer | 260/876 R |
| 3,670,052 | 6/1972 | Saito et al. | 260/876 R |
| 3,819,556 | 6/1974 | Morisawa | 260/29.6 PS |
| 3,825,621 | 7/1974 | Ford | 260/878 R |
| 3,850,651 | 11/1974 | Duncan et al. | 106/90 |
| 3,895,953 | 7/1975 | Mehta | 260/29.6 S |
| 4,000,220 | 12/1976 | Shoji et al. | 260/878 R |

OTHER PUBLICATIONS

Knapp et al., Chem. Abstr., 60, 16077g, 1964.

*Primary Examiner*—M. J. Welsh
*Attorney, Agent, or Firm*—R. G. Brookens

[57] ABSTRACT

This invention is directed to cement additives comprising (1) a polymer latex containing up to about 60 parts by weight of latex polymer solids consisting essentially of (A) the polymerized product of (a) a monomer selected from the group consisting of styrene, vinyl toluene and tertiary butyl styrene, (b) an alkyl acrylate or alkyl methacrylate having from 8 to 12 carbon atoms in the alkyl group and (c) arcylamide or methacrylamide, and (B) a butadiene rubber, (2) a nonionic surfactant and (3) a polyorganosiloxane foam depressant; and to portland cement compositions containing these additives, such cement compositions being characterized by having excellent strength and adhesion to cementitious substrates.

10 Claims, No Drawings

CEMENT ADDITIVES COMPRISING A POLYMER LATEX CONTAINING A STYRENE-ACRYLATE-ACRYLAMIDE INTERPOLYMER AND A BUTADIENE RUBBER

BACKGROUND OF THE INVENTION

Portland cement is one of the most widely used materials in the construction industry. Although unmodified concrete and cement mortar systems (i.e., those not containing a polymer latex modifier) have adequate properties for many construction applications, there remain many areas in which such properties, particularly strength, and adhesion to cementitious substrates are not acceptable. The addition of styrene-butadiene polymer latexes to portland cement have provided compositions having improved strength, flexibility and adhesion to cementitious substrates. The present invention is directed to cement additives based on certain styrene-acrylate interpolymeric latexes which additives provide portland cement compositions having significantly improved strength and adhesion to cemmentitious substrates as compared to cement compositions containing the prior known styrene-butadiene latex modifiers.

SUMMARY OF THE INVENTION

Latex-based cement additives capable of providing the combination of desirable properties as set forth above consist essentially of (1) a polymer latex containing up to about 60 parts by weight of latex polymer solids, said solids consisting essentially of (A) the polymerized product of (a) from about 45 to about 65 parts by weight of a monomer selected from the group consisting of styrene, vinyl toluene and tertiary butyl styrene, (b) from about 25 to about 40 parts by weight of a monomeric alkyl acrylate or methacrylate having from 8 to 12 carbon atoms in the alkyl group, (c) from about 0.5 to about 4 parts by weight of a monomer selected from the group consisting of acrylamide and methacrylamide, and (B) from about 1 to about 20 parts by weight of a butadiene rubber containing at least about 75 parts by weight of polymerized butadiene, and based on 100 parts by weight of said latex polymer solids, (2) from about 3 to about 10 parts by weight of a nonionic surfactant; and (3) from about 0.1 to about 5 parts by weight of a polyorganosiloxane foam depressant.

DESCRIPTION OF THE PREFERRED EMBODIMENTS

The term "portland cement" is used herein to include generally the kind of product obtained by heating lime-clay mixtures, or natural cement-rock, to such a temperature that practically the entire product is sintered, followed by grinding. The product is often a mixture of dicalcium and tricalcium silicate with lesser amounts of aluminate. Various additives can be included in accordance with conventional portland cement manufacturing practices. It will be understood that various modifications such as the hydraulic cements of the kind commonly known as calcium-aluminate cements can be used as substantial equivalents for the purposes of this invention.

In many instances, it may be desirable to combine the cement compositions of this invention with an aggregate material. In this regard, the preferred aggregate material is sand, however, any particulate material may be used including stone, gravel, pebbles, granite, carborundum, marble chips, mica and the like.

By the term "styrene-acrylate interpolymer latex" as used herein is meant any aqueous colloidal dispersion containing up to about 60 parts, and preferably from about 48 to about 58 parts, by weight of latex polymer solids consisting essentially of (A) the polymerized product of (a) from about 45 to about 65 parts and preferably from 50 to 60 parts by weight of a monomer selected from the group consisting of styrene, tertiary butyl styrene or vinyl toluene, (b) from about 25 to about 40 and preferably from 30 to 38 parts by weight of a monomeric alkyl acrylate or alkyl methacrylate containing from 8 to 12 carbon atoms in the alkyl group and preferably 2-ethylhexylacrylate or lauryl methacrylate and mixtures thereof, (c) from about 0.5 to about 4, and preferably from about 0.5 to 2.5 parts by weight of a monomer selected from the group consisting of acrylamide and methacrylamide, and (B) from about 1 to about 20 parts, preferably from about 2 to about 4 parts, by weight of a butadiene rubber containing at least about 75 parts by weight of butadiene. Exemplary of such useful butadiene rubbers are polybutadiene, copolymers of butadiene and styrene, particularly copolymers of about 75 parts by weight butadiene and about 25 parts by weight styrene; and interpolymers of butadiene, styrene and acrylonitrile, particularly interpolymers of about 75 parts by weight butadiene, about 15 parts by weight styrene and about 10 parts by weight acrylonitrile.

The polymeric latexes contemplated by the present invention are prepared by mixing the monomeric ingredients, in the proportions corresponding to the composition of the desired interpolymer, in water containing an emulsifying agent or agents along with a preformed butadiene rubber in latex form. The admixture is then heated with agitation in the presence of a peroxide catalyst to initiate copolymerization as known in the art.

Illustrative of the nonionic surfactants which are added to such latexes to form the prescribed cement modifiers are: fatty acid esters such as glycerol monostearate, diethylene glycol laurate, propylene glycol monostearate, sorbitol monolaurate and pentaerythritol monostearate; acid derivatives of ethylene oxide products such as the reaction product of six mols of ethylene oxide with one of oleic acid; condensation products of ethylene oxide with alcohols such as stearyl alcohol; and condensation products of ethylene oxide with phenols, naphthols and alkyl phenols. Preferred are the polyoxyalkylene derivatives of propylene glycol having a molecular weight of at least about 1000 to about 15,000; and the condensation products of ethylene oxide with alkyl phenols, particularly the di-butyl-phenoxynonaoxyethylene-ethanols. The above monomeric surfactants are advantageously used in concentrations of from about 3 to about 10 and preferably from about 4 to 5 parts by weight based on 100 parts of latex polymer solids. Utilization of concentrations less than about 3 parts by weight result in latex-modified cement compositions having inadequate adhesion to cementitious material to which they are conventionally applied, whereas utilization of such surfactants in concentrations exceeding about 10 parts by weight are unnecessary and may adversely affect the flow properties of the latex-modified cement compositions.

The invention further contemplates the addition to such latex of a polyelectrolyte of the type as disclosed in U.S. Pat. Nos. 3,917,574 and 3,965,032, particularly those polyelectrolytes having a number average molecular weight up to about 3000 and preferably in the range of about 1000 to about 2000, which are prepared by copolymerization of from about 3 parts by weight of monomeric methyl methacrylate with about 1 part by weight of a monomeric sulfoester of α-methylene carboxylic acid, or its salt, having the formula:

$$R-CO_2-Q-SO_3M$$

wherein the radical R is selected from the group consisting of vinyl and α-substituted vinyl, and the radical —Q— is a divalent hydrocarbon radical having its valence bonds on different carbon atoms and M is a cation. A preferred monomeric sulfoester is 2-sulfoethyl methacrylate or the sodium salt thereof.

The above prescribed polyelectrolytes are generally used in concentrations of from about 3 to about 10 parts by weight, based on 100 parts of latex polymer solids, and preferably from about 3 to about 7 parts by weight, particularly when preparing latex-modified cement mortar compositions requiring optimum workability properties. Such polyelectrolytes are generally incorporated in the latex (or the cement compositions) while in the form of aqueous dispersions containing from about 25 to 50 parts by weight of polyelectrolyte solids. The polyelectrolytes, or a portion thereof, may also be added during the polymerization reaction forming the polymer latex.

Illustrative of the polyorganosiloxanes are the condensation products resulting from polymerization of organo silane diols, as represented by the formula

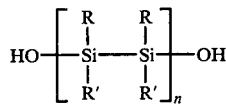

where R and R', in the above formula, represent organic radicals such as alkyl, aryl, aralkyl and alkaryl or heterocyclic groups, and $n$ is one or more. Also useful are polymerization products of organo silane diols, in the presence of an organo silane monol, and condesation products obtained from mixtures of organo silane triols, diols and monols.

Preferably the organo substituent of the siloxanes is lower alkyl (i.e., methyl, ethyl, propyl), cyclohexyl or phenyl. Most preferably it is methyl, and accordingly, the preferred polyorganosiloxanes are those which are condensation products of methyl silicols, and most preferably condensation products of dimethyl silane diol.

Polyorganosiloxanes are commercially available in several forms which are designated in the trade as "silicone fluids", "silicone emulsions" and "silicone compounds", the latter being siloxanes modified by the addition of a small percentage of finely divided silica or other inert divided solid. Any of these forms can be used in the practice of this invention.

Cement mixes are made according to the present invention by simply adding the cement additive prescribed herein to the cement with mixing and such added water as is necessary to obtain a cement mix of desired flow and working consistency. If the cement additive of the invention and portland cement are to be employed in the manufacture of mortar or concrete by admixture with a mineral aggregate, such as sand or a mixture of sand with gravel, crushed stone or equivalent coarse aggregate, the cement will ordinarily constitute, in accordance with conventional practices, more than about 10 percent by weight of the mineral aggregate and usually from about 15 to 30 percent of the weight of the mineral aggregate.

The concentration of the cement modifier solids in the cement composition is, however, critical for the obtainment of the desired combination of properties required by the present invention. In this regard, concentrations less than about 5 parts by weight, based on the weight of cement used, do not provide adequate mechanical properties such as flexibility, abrasion resistance and adherence. Further, total latex solids concentrations in excess of about 25 parts by weight based on the weight of cement may significantly reduce the mechanical properties of the composition. Preferred concentrations of latex solids are in the range of from about 10 to about 20 parts by weight.

The following example, wherein all parts and percentages are by weight, serves to illustrate the concepts of the present invention.

EXAMPLE

Part A — Preparation of Cement Additives

A typical formulation for preparing the cement additives of the present invention is as follows:

|  | Grams | Parts/100 Parts Polymer |
|---|---|---|
| Deionized water | 212 | 42.4 |
| Dihexylester of sodium sulfo-succinic acid (5% aqueous solution) | 45 | 9.4 |
| Dioctyl ester of sodium sulfo-succinic acid (1% aqueous solution) | 75 | 15.6 |
| Polybutadiene latex (50.4% solids) | 38 | 8 |

The above ingredients were charged into a 2-liter, 5-necked flask fitted with a stirrer, $N_2$ inlet tube and a condenser. The contents of the flask were stirred and nitrogen bubbled therethrough for 10–20 minutes. Heating was then started and a positive pressure of nitrogen maintained throughout the polymerization. When the temperature became steady at 90° C., the following materials were continuously added:

| 1. | Monomer Feed (3 Hrs.) | Grams | Parts/100 Parts Polymer |
|---|---|---|---|
|  | Styrene | 278.4 | 58 |
|  | 2-Ethylhexylacrylate | 172.8 | 36 |
| 2. | Aqueous Acrylamide Feed (2 Hrs.) |  |  |
|  | Deionized water | 80 | 16.7 |
|  | Acrylamide | 9.6 | 2 |
| 3. | Catalyst Feed (3 Hrs.) |  |  |
|  | Deionized water | 90 | 18.8 |
|  | Potassium persulfate | 1.5 | 0.31 |

After addition of such materials was completed, the heating was continued for an additional B 1–2 hours. The latex so formed was cooled and filtered. A stable latex comprising 48% solids was obtained. The latex was then formulated with a nonionic polyglycol stabilizer (di-butylphenoxynona-oxyethylene-ethanol) and a polyorganosiloxane antifoamer.

|  | Grams | Parts Solids/100 Parts Polymer |
|---|---|---|
| Latex (48% solids) | 229.2 | 100 |
| Nonionic stabilizer |  |  |

-continued

|  | Grams | Parts Solids/100 Parts Polymer |
|---|---|---|
| (50% aqueous solution) | 11.0 | 5 |
| Polyorganosiloxane antifoamer (10% aqueous solution) | 4.4 | 0.4 |

Part B — Preparation of Mortar Mixes

Mortar mixes were prepared according to the following:

| Standard mix recipe: | Parts |
|---|---|
| Standard Ottawa Crystal Silica Sand | 3 |
| Peerless Type I Portland Cement | 1 |
| Formulated Latex Solids | 0.15 |
| Water | 0.35 |

The above ingredients were placed in a Hobart mixer and mixed for 60 seconds at low speed. The mixer was then stopped, the sides of the bowl were scraped with a spatula, and the mixing continued for an additional 30 seconds. The consistency of the mix and its density were measured by filling a standard brass 400 cc cylindrical container with mortar, weighing it, and immediately measuring its consistency with a Vicat penetrometer. The reading obtained is the penetration in mm of a 3.5 in., 400 gram cone dropped into the mix from its surface (ASTM C 472-64). For some latexes, further information on consistency of mixes was found by measuring workability factor and stability as hereinafter described.

Each mortar was then molded into 6 individual 2 in. cubes and 6 tensile briquettes with a 1 sq. in. cross section. The samples were cured under wet towels for 24 hours and then removed from the molds and weighed. These specimens were subsequently cured for 27 additional days at 75° F. and 50% relative humidity and weighed again. Half of the samples were tested for dry compressive strength (ASTM 109-64) and tensile strength (ASTM C 190-63). The remaining specimens were immersed in water for an additional 7 days, weighed, and then tested wet. After breaking these wet samples, the depth of penetration of water was measured and recorded.

Part C — Testing Data

1. Mortar Strength Properties

Table I

Effect of Styrene-Type Monomer on Mortar Strength

| Composition | Compressive (PSI) | | Tensile (PSI) | |
|---|---|---|---|---|
|  | Dry | Wet | Dry | Wet |
| (The Invention) | | | | |
| 56/34/2/8 ST/EHA/AAM/R | 8210 | 6325 | 1070 | 690 |
| 56/34/2/8 VT/EHA/AAM/R | 7890 | 6210 | 1170 | 700 |
| 60/30/2/8 VT/EHA/AAM/R | 8500 | 6840 | 1080 | 660 |
| 56/34/2/8 TBS/EHA/AAM/R | 8700 | 6850 | 1070 | 600 |

ST (Styrene)
EHA (2-Ethylhexyl Acrylate)
AAM (Acrylamide)
R (Polybutadiene Rubber Latex)
VT (Vinyl Toluene)
TBS (Tertiary Butyl Styrene)

Table I shows that vinyl toluene (VT) and t-butyl styrene (TBS) are essentially equivalent to styrene in compressive strength, particularly in wet compressive strength.

Table II

Effect of Methyl Methacrylate (MMA) as Replacement for Styrene-Type Monomer

| Composition | Compressive (PSI) | | Tensile (PSI) | |
|---|---|---|---|---|
|  | Dry | Wet | Dry | Wet |
| For Comparison | | | | |
| MMA/EHA/AAM/R 56/38/2/4 | 7460 | 5470 | 1230 | 575 |
| The Invention | | | | |
| ST/EHA/AAM/R 58/36/2/4 | 8625 | 6720 | 1040 | 800 |

MMA (Methyl Methacylate)
EHA (2-Ethylhexyl Acrylate)
AAM (Acrylamide)
R (Polybutadiene Rubber Latex)
ST (Styrene)

The data presented in Table II show the marked reduction in compressive strength of mortar utilizing a cement additive containing methyl methacrylate as a replacement for the prescribed styrene-type monomer of the present invention. Additionally, such mortar composition was slow to cure and had poor workability as shown by a steadily increasing Vicat penetrometer reading.

Table III

Effect of Butyl Acrylate (BA) as a Replacement For Ethylhexylacrylate (EHA) on Mortar Strength

| Composition | Compressive (PSI) | | Tensile (PSI) | |
|---|---|---|---|---|
|  | Dry | Wet | Dry | Wet |
| The Invention | | | | |
| ST/EHA/AAM/R | | | | |
| 52/30/2/116 | 7900 | 6200 | 1070 | 630 |
| 54/28/2/16 | 7820 | 6100 | 1075 | 590 |
| 48/30/2/20 | 7020 | 5400 | 1010 | 550 |
| 50/28/2/20 | 7370 | 5460 | 1010 | 610 |
| 52/26/2/20 | 7300 | 5550 | 920 | 550 |
| For Comparison | | | | |
| ST/BA/AAM/R | | | | |
| 46/36/2/16 | 5830 | 3650 | 850 | 420 |
| 44/34/2/20 | 6540 | 4140 | 1000 | 450 |

ST (Styrene)
EHA (2-Ethylhexyl Acrylate)
AAM (Acrylamide)
R (Polybutadiene Rubber Latex)
BA (Butyl Acrylate)

The data presented in Table III above illustrate that EHA provides mortars of greatly improved compressive and tensile strengths. An additional advantage of EHA is that more styrene, which is less expensive, can be incorporated into the interpolymer while maintaining excellent film forming properties. In this regard, higher levels of butyl acrylate are required to provide an acceptable room temperature film forming polymer of adequate tensile strength.

TABLE IV

Effect of Acrylate Monomer on Mortar Strength and Elasticity

| Composition | Compressive Strength (PSI) 7 Days | Compressive Strength (PSI) 28 Days | Elastic Modulus, PSI $\times 10^{-6}$ |
|---|---|---|---|
| For Comparison | | | |
| Control - No latex | 4554 | 5060 | 3.96 |
| 30/64/2/4 ST/EA/AAM/R | Not Available | 4058 | 1.46 |
| 52/42/2/4 ST/BA/AAM/R | 5021 | 6350 | 3.16 |
| The Invention | | | |
| 54/10/30/2/4 ST DCPDA/EHA/AMM/R | 5884 | 7367 | 3.64 |
| 61/33/2/4 ST EHA AAM R | 6096 | 7786 | 3.80 |
| 58/36/2/4 ST LMA AAM R | 5748 | 6749 | 3.98 |
| 58/20/16/2/4 ST LMA EHA AAM R | 5768 | 7624 | 3.57 |

ST (Styrene)
EA (2-Ethyl Acrylate)
BA (Butyl Acrylate)
DCPDA (Dicyclopentadiene Acrylate)
LMA (Lauryl Methacrylate)
AAM (Acrylamide)
R (Polybutadiene Rubber Latex)
EHA (Ethylhexyl Acrylate)

The data in Table IV show that utilization of an alkyl acrylate or alkyl methacrylate containing from 8 to 12 carbon atoms in the alkyl group is necessary to provide enhanced compressive strength while maintaining a desirably high elastic modulus.

Table V

Effect of Type of Rubber Latex
Composition: ST/EHA/AAM/R (52/30/2/16)

| Rubber Composition | Compressive (PSI) Dry | Compressive (PSI) Wet | Tensile (PSI) Dry | Tensile (PSI) Wet |
|---|---|---|---|---|
| Polybutadiene | 7900 | 6200 | 1070 | 630 |
| Butadiene/styrene (75/25) | 7700 | 5900 | 970 | 640 |
| Butadiene/styrene/acrylonitrile (75/15/10) | 7740 | 5750 | 1060 | 700 |

ST (Styrene)
EHA (2-Ethylacrylate)
AAM (Acrylamide)
R (Polybutadiene Rubber Latex)

The effect of the type of butadiene rubber latex on strength of the mortar was determined and is shown in Table V. It can be seen that only small differences in strength were found for the three different compositions, even at this high rubber level (16%). Workability factor and stability were not determined, but the wet mortar mixes are characterized by similar water demand, consistency, and densities. Thus, any of the rubbers listed in Table V above are satisfactory for the purposes of the present invention.

Table VI

| Latex | Compressive (PSI) Dry | Compressive (PSI) Wet | Tensile (PSI) Dry | Tensile (PSI) Wet | Vicat (mm) | W/C[1] | L/C[2] |
|---|---|---|---|---|---|---|---|
| For Comparison | | | | | | | |
| None | 4310 | 4310 | 330 | 400 | 36 | 0.53 | 0 |
| Modifier A | 6220 | 5040 | 850 | 550 | 33 | 0.35 | 0.15 |
| The Invention | | | | | | | |
| ST/EHA/AAM/R 58/26/2/4 | 8625 | 6720 | 1040 | 800 | 35 | 0.35 | 0.15 |

[1] Water to Cement ratio.
[2] Latex to cement ratio.
ST (Styrene)
EHA (2-Ethylhexyl Acrylate)
AAM (Acrylamide)
R (Polybutadiene Rubber Latex)

The above data illustrate the improved results obtained utilizing a cement modifier prescribed by the present invention as compared to (A) an unmodified mortar composition, and (B) a mortar containing a prior known and commercially used cement modifier based on a latex of about 66 parts by weight styrene and about 34 parts by weight butadiene, which cement modifier is widely used for bridge deck resurrfacing (Modifier A). It is to be noted that both Modifier A and the cement modifier illustrative of the present invention contain (A) 5 parts per 100 parts of latex polymer solids of the nonionic surfactant di-t-butylphenoxynonaoxyethyleneethanol, and (B) 0.4 part per 100 pts. of latex polymer solids of a polyorganosiloxane foam depressant (a condensation product of dimethyl silane diol).

2. Mortar Workability and Stability Properties

Unmodified portland cement mortar exhibits a yield stress and at finite stress the mortar will not flow. This is often a desirable property for a cement composition. For example, a cement composition for a sloping bridge deck requires this property in order to easily retain a uniform thickness of overlayment before setting. Additionally, a brick mortar requires this property in order that successive courses of brick can be built up without compressing the wet mortar of previous layers. This yield stress is measured by determining the "workability factor".

The workability factor is tested by making a cement paste of 282 grams portland cement, 150 grams Piqua marble flour, 123 grams formulated latex and heated water (120° F.) in an amount sufficient to give the proper consistency. This consistency should correspond to about 80% of full scale deflection of the recorder chart pen when the paste is tested using a Brabender Viscocorder at 25 rpm and using a 125 gram-cm torque spring.

Workability factor is the ratio of the torque reading after the rotation of the cup containing the paste stops and the pen is at rest, to the torque reading when the cup is rotating. A high value of the workability factor indicates a high yield stress.

The mortar must remain fluid enough to work for a reasonable time after mixing. Some latex modified mortars lose fluidity rapidly especially at higher temperatures. This property is measured by the 100° F. stability test which is conducted by making a paste similar to the one used for workability factor. The paste is put in a cup immersed in a water bath at 100° F. and the Brabender Fiscocorder is now run with a 500 gram-cm torque spring at 25 rpm. The time in which the initial torque reading doubles is taken as the stability. This time should exceed 30 minutes for an acceptable latex.

Table VII

Effect of Acrylamide on Mortar Strength and Wet Mortar Properties plus (34% EHA 8% R)

| Composition ST/AAM | Compressive (PSI) Dry | Compressive (PSI) Wet | Tensile (PSI) Dry | Tensile (PSI) Wet | Workability Factor | Stability (Min.) |
|---|---|---|---|---|---|---|
| For Comparison | | | | | | |
| 58/0 | 8270 | 6525 | 1000 | 650 | 0.14 | 4 |
| The Invention | | | | | | |
| 57/1 | 8210 | 6180 | 960 | 700 | 0.50 | >30 |
| 5/2 | 8375 | 6290 | 960 | 650 | — | — |
| | | | | | Plus (36% EHA 4% R) | |
| 59/1 | — | — | — | — | 0.86 | >30 |
| 58/2 | 8625 | 6720 | 1040 | 800 | 0.64 | >30 |

ST (Styrene)
AAM (Acrylamide)
EHA (2-Ethylhexyl Acrylate)
R (Polybutadiene Rubber Latex)

The data presented in Table VII above illustrate that the utilization of acrylamide in the prescribed cement additives significantly enhances both the stability and workability of such materials.

The use of acrylamide also permits the prescribed interpolymer latex to be made with lower waste levels.

Table VIII

Effect of Replacement of Acrylamide with Other Water Soluble Monomers

| Composition* | % | Compressive (PSI) Dry | Compressive (PSI) Wet | Tensile (PSI) Dry | Tensile (PSI) Wet | Workability Factor | Stability (Min.) |
|---|---|---|---|---|---|---|---|
| Monomer | | | | | | | |
| The Invention | | | | | | | |
| Acrylamide | 2 | 8375 | 6290 | 960 | 650 | — | — |
| Methacrylamide | 2.5 | 8000 | 6100 | 1100 | 565 | — | — |
| For Comparison | | | | | | | |
| Methacrylic Acid | 2.5 | 8230 | 6180 | 990 | 650 | 0.12 | 14 |
| Hydroxyethylacrylate | 2 | 7260 | 5590 | 1110 | 720 | — | — |
| AAM/MAA | 1/1 | 6370 | 4780 | 970 | 500 | — | — |

*Polymer composition was 34% EHA, 8% R and either 56% ST, 2% water soluble monomer; or 55.5% ST, 2.5% water soluble monomer.
EHA (2-Ethylhexyl Acrylate)
R (Polybutadiene Rubber Latex)
ST (Styrene)
AAM (Acrylamide)
MAA (Methacrylic Acid)

The data presented in Table VIII above illustrate that only methacrylamide was a satisfactory replacements for acrylamide. More particularly, the use of mmethacrylic acid resulted in wet mortar compositions having poor stability and workability. Hydroxyethylacrylate and a mixture of acrylamide and methacrylic acid gave mortars of low strength. Instability, problems in wet mortar were also observed in the comparative systems as extra water was required in the mixes in order to make them workable. Also, methacrylamide and acrylamide were the only monomers which gave clean latex preparations.

Table IX

Effect of Amount of Butadiene Rubber Latex

| Composition | Compressive (PSI) Dry | Compressive (PSI) Wet | Tensile (PSI) Dry | Tensile (PSI) Wet | Workability Factor | Stability (Min.) |
|---|---|---|---|---|---|---|
| ST/EHA/ AAM/R | | | | | | |
| The Invention | | | | | | |
| 50/28/2/20 | 7370 | 5640 | 1010 | 610 | — | — |
| 54/28/2/16 | 8125 | 6090— | 960 | 640 | 0.55–0.45* | — |
| 56/34/2/8 | 8210 | 6325 | 1070 | 690 | — | — |
| 58/36/2/4 | 8625 | 6720 | 1040 | 800 | 0.64 | >30 |
| 59/37/2/2 | 8400 | 6610 | 1110— | 680 | 0.75 | >30 |
| For Comparison | | | | | | |
| 58/40/2/0 | 8240 | 6425 | 1190 | 800 | 0.51–0.36* | — |

R (Polybutadiene rubber latex)
ST (Styrene)
EHA (2-Ethylhexyl Acrylate)
AAM (Acrylamide)
*Workability factor decreased during test The data presented in Table IX above illustrate that optimum cured mortar strengths and wet mortar workability factor and stability are found at concentrations of from about 2 to 20 and, particularly, from 2 to 4 parts by weight of the butadiene rubber. Further, a butadiene rubber latex is necessary in the interpolymer latex preparation to form a low viscosity, high solids latex material.

Table X

Effect of Styrene-Type Monomer on Workability and Stability

| | Workability Factor | Stability (Min.) |
|---|---|---|
| For Comparison | | |
| MMA/EHA/AAM/R 56/38/2/4 | 0.32 | 21 |
| The Invention | | |
| VT/EHA/AAM/R 62/32/2/4 | 0.80 | >30 |
| ST/EHA/AAM/R | 0.64–0.85 | >30 |

Table X-continued
Effect of Styrene-Type Monomer on Workability and Stability

58/36/2/4

MMA (Methyl Methacrylate)
AAm (Acrylamide)
ST (Styrene)
EHA (2-Ethylhexyl Acrylate)
R (Polybutadiene Rubber Latex)
VT (Vinyl Toluene)

The data set forth in Table X above illustrate that methyl methacrylate (MMA) provides poor workability and stability as compared to cement additives contemplated by the present invention.

3. Mortar Adhesion to Cementitious Substrates

The adhesion of a latex-modified mortar or concrete to a substrate is important in at least two of its applications. These are its use in a brick mortar and for bridge deck resurfacing, where the new concrete overlay must adhere to the old concrete surface. These properties were tested using methods for determining cross-brick strength, and shear bond strength, respectively.

The cross-brick strength is determined by bonding two bricks together at 90° to each other, curing for 7 days and determining the force/unit area required to separate them. The wet strength is found by immersing the cured samples in water for three additional days and then testing in the same way.

In each of the following experiments, mortar was prepared by mixing the following ingredients in a Hobart-type mixer.

|  | Grams |
|---|---|
| Standard Ottawa "crystal silica sand" | 975 |
| Peerless Brand Type I Portland cement | 300 |
| Piqua marble flour | 150 |
| Formulated latex solids | 48 |
| Water to proper consistency | |

Table XI
Cross-brick Strength of Mortar

| Latex | Composition | L/C | W/C | Vicat | Density g/cm³ | Cross-brick Strength (PSI) Dry | Cross-brick Strength (PSI) Wet |
|---|---|---|---|---|---|---|---|
| For Comparison | | | | | | | |
| None | — | — | 1 | — | 1.90 | >10 | >10 |
| The Invention | | | | | | | |
| ST/EHA/AAM/R | 56/26/2/16 | 0.16 | 0.479 | 70 | 130.0 | 233 | 172 |
| ST/EHA/AAM/R | 54/32/2/12 | 0.16 | 0.479 | 67 | 132.2 | 169 | 134 |

L/C = Latex to cement ratio
W/C = Water to cement ratio
Dry = Cured for 7 days at R.T. and 50% R.H.
Wet = 7 Days dry cure and then immersing in room temperature for 3 days.
ST (Styrene)
EHA (2-Ethylhexyl Acrylate)
AAM (Acrylamide)
R (Polybutadiene Rubber Latex)

The data presented in Table XI above illustrate that the cement additives of the present invention provide mortar compositions having excellent cross-brick strengths.

Table XII
Shear Bond Strengths of Mortars

|  | Comparison No Latex Control | Comparison Modifier A | The Invention ST/EHA/AAM/R 56/34/2/8 |
|---|---|---|---|
| Sand (2NS) | 1500 | 1500 | 1500 |
| Cement (Type I) | 462 | 462 | 462 |
| Latex | 0 | 144 | 146.8 |
| Water | 217 | 80.2 | 71 |
| Water/Cement | 0.47 | 0.323 | 0.321 |
| Vicat (mm) | 46 | 38 | 49 |
| Density (lb/ft³) | 138.8 | 139.1 | 139.5 |
| Dry Shear Bond (PSI) | 246 | 393 | 724 |

ST (Styrene)
EHA (2-Ethylhexyl Acrylate)
AAM (Acrylamide)
R (Polybutadiene Rubber Latex)

Shear bond strength samples were prepared by first casting a 3 inch diameter by 6 inch concrete cylinder. The concrete cylinder was cured for at least 28 days, and the surface prepared by sawing off one of the surfaces and belt-grinding until smooth. This surface was then overlaid with a 1 inch thickness of the modified mortar. The samples were cured for 28 days at 75° F. and 50% relative humidity and tested. The test consists of clamping the base cylinder in a holder and applying a downward force to the overlay in a direction normal to the axis of the cylinder. The force per unit area required to break the overlay is called the shear-bond strength and is given in Table XII above. Such data illustrate that the cement modifier contemplated by the present invention provides unexpectedly enhanced dry shear bond strength as compared to an unmodified mortar and a mortar containing the prior known cement modifier identified as Modifier A (a description of Modifier A is set forth immediately following Table VI).

4. Elastic Modulus Properties

Table XIII
Elastic Modulus in Compression

|  | Comparison No Latex | Comparison Modifier A | The Invention ST/EHA/AAM/R 53/30/2/16 |
|---|---|---|---|
| Sand (2NS) | 3900 | 3900 | 3900 |
| Type I Portland Cement | 1200 | 1200 | 1200 |
| Latex | 0 | 375 | 385 |
| Water | 450 | 75 | 55 |
| Sand/Cement | 3.25 | 3.25 | 3.25 |
| Water/Cement | 0.445 | 0.295 | 0.287 |
| Vicat (mm) | 45 | 52 | 54 |
| Density (lb/ft³) | 144.4 | 143.4 | 145.1 |
| Elastic Modulus (PSI × 10⁻⁶) | 4.49 | 3.52 | 4.30 |
| Maximum Stress | 7100 | 7040 | 8570 |

Table XIII-continued

| | Elastic Modulus in Compression | |
|---|---|---|
| Comparison No Latex | Comparison Modifier A | The Invention ST/EHA/AAM/R 53/30/2/16 |

(PSI)

ST (Styrene)
AAM (Acrylamide)
EHA (2-Ethylhexyl Acrylate)
R (Polybutadiene Rubber Latex)

The elastic modulus in compression is an important variable when concrete or mortar is to be used in construction. It is known, and verified below, that styrene-butadiene latex reduces this modulus as compared to a control mortar or concrete. A sample of the modified mortar of the present invention, and appropriate controls were cast in 3 in. × 16 in. cylinders, cured 28 days at 75° F. and 50% R.H., and the elastic modulus measured. Table XIII above shows that the cement modifier of the present invention unexpectedly provided mortar compositions having an improved elastic modulus as compared to those mortar compositions containing the comparative Modifier A. The elastic modulus is only slightly lower than the mortar with no latex. The latex used here contained 16% rubber. Lowering this value to 2 to 4% R further improves such elastic modulus, (a description of Modifier A is set forth immediately following Table VI).

What is claimed is:

1. A cement additive consisting essentially of (1) a polymer latex containing up to about 60 parts by weight of latex polymer solids, said solids consisting essentially of (A) the polymerized product of (a) from about 45 to about 65 parts by weight of a monomer selected from the group consisting of styrene, vinyl toluene and tertiary butyl styrene, (b) from about 25 to about 40 parts by weight of a monomeric alkyl acrylate or alkyl methacrylate containing from 8 to 12 carbon atoms in the alkyl group, (c) from about 0.5 to about 4 parts by weight of a monomer selected from the group consisting of acrylamide and methacrylamide, and (B) from about 1 to about 20 parts by weight of a butadiene rubber containing at least about 75 parts by weight of polymerized butadiene; and based on 100 parts by weight of said latex polymer solids (2) from about 3 to about 10 parts by weight of a nonionic surfactant, and (3) from about 0.1 to about 5 parts by weight of a polyorganosiloxane foam depressant.

2. The cement additive of claim 1 wherein said alkyl acrylate or alkyl methacrylate is selected from the group consisting of 2-ethylhexyl acrylate, lauryl methacrylate and mixtures thereof.

3. The cement additive of claim 2 wherein said nonionic surfactant is a di-butyl-phenoxynonaoxyethylene-ethanol.

4. The cement additive of claim 3 wherein said polyorganosiloxane foam depressant is a condensation product of dimethyl silane diol.

5. The cement additive of claim 4 wherein said latex polymer solids are the polymerization product of monomeric styrene, 2-ethylhexyl acrylate and acrylamide in combination with a polybutadiene rubber.

6. A portland cement composition comprising a mixture of portland cement and from about 10 to about 25 parts, based on the weight of said portland cement of a cement additive consisting essentially of (1) a polymer latex containing up to about 60 parts by weight of latex polymer solids, said solids consisting essentially of (A) the polymerized product of (a) from about 45 to about 65 parts by weight of a monomer selected from the group consisting of styrene, vinyl toluene and tertiary butyl styrene, (b) from about 25 to about 40 parts by weight of a monomeric alkyl acrylate or alkyl methacrylate having from 8 to 12 carbon atoms in the alkyl group, (c) from about 0.5 to about 4 parts by weight of a monomer selected from the group consisting of acrylamide and methacrylamide, and (B) from about 1 to about 20 parts by weight of a butadiene rubber containing at least about 75 parts by weight of polymerized butadiene; and based on 100 parts by weight of said latex polymer solids, (2) from about 3 to about 10 parts by weight of a nonionic surfactant, and (3) from about 0.1 to about 5 parts by weight of a polyorganosiloxane foam depressant.

7. The portland cement composition of claim 6 wherein said alkyl acrylate or alkyl methacrylate is selected from the group consisting of 2-ethylhexyl acrylate, lauryl methacrylate and mixtures thereof.

8. The portland cement composition of claim 7 wherein said nonionic surfactant is a di-butyl-phenoxynonaoxyethylene-ethanol.

9. The portland cement composition of claim 8 wherein said polyorganosiloxane foam depressant is a condensation product of dimethyl silane diol.

10. The portland cement composition of claim 9 wherein said latex polymer solids are the polymerization product of monomeric styrene, 2-ethylhexyl acrylate and acrylamide in combination with a polybutadiene rubber.

* * * * *